(12) United States Patent
Scrapper et al.

(10) Patent No.: US 11,599,109 B2
(45) Date of Patent: Mar. 7, 2023

(54) MISSION MODELING PLANNING, AND EXECUTION MODULE (M2PEM) SYSTEMS AND METHODS

(71) Applicants: Naval Information Warfare Center Pacific, San Diego, CA (US); California Institute Of Technology Jet Propulsion Laboratory, Pasadena, CA (US)

(72) Inventors: Chris Scrapper, San Diego, CA (US); Greg N Droge, San Diego, CA (US); Alexander L Xydes, San Diego, CA (US); Jean-Pierre de la Croix, Los Angeles, CA (US); Amir Rahmani, Los Angeles, CA (US); Joshua Vander Hook, Los Angeles, CA (US); Grace Lim, Norwalk, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 617 days.

(21) Appl. No.: 16/403,838

(22) Filed: May 6, 2019

(65) Prior Publication Data
US 2019/0339691 A1    Nov. 7, 2019

Related U.S. Application Data

(60) Provisional application No. 62/667,241, filed on May 4, 2018.

(51) Int. Cl.
*G05D 1/00* (2006.01)
*G06F 8/40* (2018.01)
*G06Q 10/067* (2023.01)

(52) U.S. Cl.
CPC ......... *G05D 1/0027* (2013.01); *G05D 1/0016* (2013.01); *G06F 8/40* (2013.01); *G06Q 10/067* (2013.01)

(58) Field of Classification Search
CPC .............. G05D 1/0027; G05D 1/0016; G05D 2201/0209; G06F 8/40; G06F 8/33; G06F 8/34; G06F 9/45508; G06Q 10/067
See application file for complete search history.

(56) References Cited

U.S. PATENT DOCUMENTS

2012/0095619 A1 *   4/2012   Pack ................... G05D 1/0274
701/2

OTHER PUBLICATIONS

Lucas Bueno Ruas de Oliveira, Architectural design of service-oriented robotic systems, 2015, Universite De Bretagne-Sud, pp. 28-29, 39, 85-86 128-133 (Year: 2015).*

(Continued)

*Primary Examiner* — Aniss Chad
*Assistant Examiner* — Chase L Cooley
(74) *Attorney, Agent, or Firm* — Naval Information Warfare Center, Pacific; Kyle Eppele; Matthew D. Pangallo

(57) ABSTRACT

Methods and systems for accomplishing a mission using a plurality of unmanned vehicles can include graphically describing the mission tasks at a graphical user interface (GUI) using Business Process Model Notation (BPMN), and translating the graphical description into extensible machine language (XML) formatted robot operating system (ROS) instructions, which can be understood by each of the plurality of unmanned vehicles with a translator. An execution engine transmits the XML ROS instructions to a respective local controller on the respective unmanned vehicle. The BPMN graphical descriptor symbols can allow for planning of a mission by an end user that does not have expertise in the ROS domain, and that does not have an understanding of (Continued)

the ROS construct. The execution engine can provide feedback back to the GUI regarding mission execution. Based on the feedback, the graphical description can be modified while the mission is being accomplished.

14 Claims, 10 Drawing Sheets

(56) References Cited

OTHER PUBLICATIONS

Richard C. Simpson, An XML Representation for Crew Procedures, 2004, NASA pp. 18-3 and 18-5 (Year: 2004).*
Morgan Quigley, Brian Gerkey, Ken Conley, Josh Faust, ROS: an open-source Robot Operating System, 2013, Stanford, pp. 1-3 (Year: 2015).*
Isuru Wijesinghe, Heshan Jayasinghe, Web (Javascript / D3) based BPMN editor to support a subset of commonly used BPMN constructs, 2016, Google, pp. 1 (Year: 2016).*
Matt Webster, Clare Dixon, Michael Fisher, Maha Salem, Joe Saunders, Kheng Lee Koay, Kerstin Dautenhahn, Joan Saez-Pons, Toward Reliable Autonomous Robotic Assistants Through Formal Verification: A Case Study, 2016, IEEE, pp. 187-190 (Year: 2016).*
Powell, D., Gilbreath, G., Bruch, M., Multi-robot operator control unit, 2006, Space and Naval Warfare Systems Center, San Diego, pp. 4-5 (Year: 2006).*
Spin Vardi Intro Tutorial, Ian Barland, Moshe Vardi, John Greiner, 2007, CNX.org, pp. 1 and 8 (Year: 2007).*
Parrot, Freeflight Pro User Guide, 2016, Parrot, pp. 2, 64-66 (Year: 2016).*
Bernd Ruecker; Rendering BPMN and highlight current task using bpmn.io; 2015; camunda.com (Year: 2015).*
Stephen White; Business Process Modeling Notation, V1.1; 2008; Object Management Group; pp. 1 36-38 (Year: 2008).*
Jean-Pierre de la Croix et al., "Mission Modeling, Planning, and Execution Module for Teams of Unmanned Vehicles", Proceedings of SPIE, Proc. SPIE 10195, Unmanned Systems Technology XIX, 101950J (May 5, 2017): doi: 10.1117/12.2266881 (2017).
D. Powell, G. Gilbreath, and M. Bruch, entitled "Multi-Robot Operator Control Unit", Proc. SPIE 6230, Unmanned Systems Technology VIII, 62301N (May 12, 2006); doi: 10.1117/12.66381 (2016).

* cited by examiner

MISSION MODELING PLANNING, AND EXECUTION MODULE (M2PEM) SYSTEMS AND METHODS

CROSS REFERENCE TO RELATED APPLICATIONS

This application claims the benefit of U.S. Provisional Application 62/667,241, filed May 4, 2018, by Christopher Scrapper et al., entitled "Mission Modeling, Planning and Execution Module (M2PEM)". The contents of the '241 application are hereby incorporated by reference into this specification.

FEDERALLY SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil, referencing 104543.

FIELD OF THE INVENTION

The present invention pertains generally to systems and methods for mission planning frameworks. More specifically, this invention pertains to systems and methods for graphically describing modular, reconfigurable unmanned systems mission planning framework using Business Process Models Notation (BPMN) notation. The invention is particularly, but not exclusively, useful as a mission modeling, planning and execution system that can allow for the coordinated control of cross-domain platform-based teams of unmanned vehicles, despite having no domain awareness of the unmanned vehicle robot operating system (ROS) construct.

BACKGROUND OF THE INVENTION

Autonomous control of a single robotic system with attached payloads for sensing the environment can be a daunting task and has been the subject of much research in recent years. Not only must there be planning to ensure the movement of the robot is safely constrained, but sensors must be actuated based on different environmental stimuli, and sensitive equipment must be activated or even listened to at the appropriate time. The complexities of dealing with such a system of systems is compounded when adding multiple robots to form an unmanned team and even more so when coordinating teams of teams. The difficulties of managing all of the resources at hand can then become exponentially greater when considering a mission with any substantial duration and can be even further compounded when the robots are heterogeneous and have different modalities for control.

To reduce complexity of the coordination of unmanned assets, control modalities are often designed to achieve a specific collective outcome such as route traversal, area search, maintaining formation, perimeter patrol, etc. These modalities can then be used as atomic building blocks where different phases of a mission are executed by commanding one or more unmanned systems to execute a sequence of these modalities.

There have been several approaches in the prior art that use control modalities as atomic building blocks for mission design. A very common approach can consist of needs-based allocation approaches. In needs-based approaches, the fundamental idea can be that a need is directly solved by one of the atomic building blocks. When a need is detected (possibly at a random time), resource allocation techniques can be used to assign one or more systems to the atomic control modality that will address the given need. When the need has been addressed or if a more eminent, higher priority need is detected, the resources can be freed to be re-allocated. While such approaches are robust to varying mission requirements and resource availability or failure, they are not well-suited for mission design before the fact. They do not directly allow a subject matter expert to influence the orchestration and sequencing of multiple atomic modalities for missions consisting of multiple phases or long-term operations.

As an alternative approach to mission design, methods which can employ an automaton (or finite state machine) can be implemented. These approaches directly allow for visualization of the sequencing of different mission phases or states, but suffer in terms of expression of parallel execution of the atomic control modalities and visualization of decision logic. And parallel execution of such modalities can often be necessary when planning and executing missions that can involve swarms of robots.

For mission design (or more generally process design), business process modeling notation (BPMN) has been developed to visually lay out the mission as an expressive, hierarchical process flow diagram. BPMN notation can include the ability to sequence parallel threads of atomic process components, represent decision points and corresponding process flows, allow for merging and diverging of parallel flows, and the ability to use hierarchical abstractions to simplify mission design. But while BPMN can be an excellent design tool in general, it lacks the ability to express resource requirements or deal with resource failures and there is a fundamental disconnect between mission planning and execution.

What is needed is a system and method that can overcome the disadvantages cited above, and that can bridge the gap between planning and execution of unmanned systems missions, to allow for both planning and execution by an end user that may be an expert in tactics, but that may not necessarily be an expert in software programming to program the unmanned vehicles to carry out the desired tactics.

In view of the above, it can be an object of the present invention to provide a system and method for mission design for a team of unmanned vehicles that does not require programming configuration and/or mission files in each unmanned vehicle separately. Another object of the present invention can be to provide a system and method for mission design of a team of unmanned vehicles that can be accomplished using a combined editing and visualization tool. Still another object of the present invention can be to provide a system and method for mission design of a team of unmanned vehicles that can be accomplished without domain knowledge of the operating systems of the unmanned vehicles. Yet another object of the present invention can be to provide a standardized method for communication between the user and a team of unmanned vehicles, when the unmanned vehicles are different from each other. Still another object of the present invention can be to provide a system and method for mission design for a team of unmanned vehicles that can accommodates the design of a mission while considering resource management requirements for execution. Another object of the present invention can be to provide a system and method for mission design of a team of unmanned vehicles, and control of the vehicles during the mission, that can be easily accomplished by a user without a software programming background, in a cost efficient manner.

SUMMARY OF THE INVENTION

Methods and systems for accomplishing a mission using a plurality of unmanned vehicles, can include the step of graphically describing the mission tasks at a graphical user interface (GUI) using Business Process Model Notation (BPMN), and translating the graphical description into formatted robot operating system (ROS) instructions which can be input into each unmanned vehicle in the plurality. The graphical description step can be accomplished at a graphical user interface (GUI) by a user, and the symbols that can be used for the graphical description can be a subset of the BPMN 2.0 symbol set. The use of BPMN graphical descriptors can allow for planning of a mission by an end user that does not have expertise in the ROS domain, and that does not have an understanding of the ROS. The translating step can be accomplished by a translator module into extensible machine language (XML) for the ROS interface.

The methods and systems can further include the step of transmitting the formatted instructions to a plurality of unmanned vehicles with an execution engine, and executing the mission by the plurality of unmanned vehicles using the formatted instructions. The execution engine can provide feedback back to the GUI regarding mission execution. Based on the feedback (or other unrelated end user desires), the graphical description can be modified while the missions is being accomplished. The mission can be verified using a SPIN checker, which can compare a linear temporal logic (LTL) expression of the mission with a PROMELA® translation of the XML mission file, to verify the mission logic can be correct and can be achieved by the plurality of robots.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The novel features of the present invention will be best understood from the accompanying drawings, taken in conjunction with the accompanying description, in which similarly-referenced characters refer to similarly-referenced parts, and in which.

DETAILED DESCRIPTION OF THE EMBODIMENTS

1. Overview

Figure 1A:
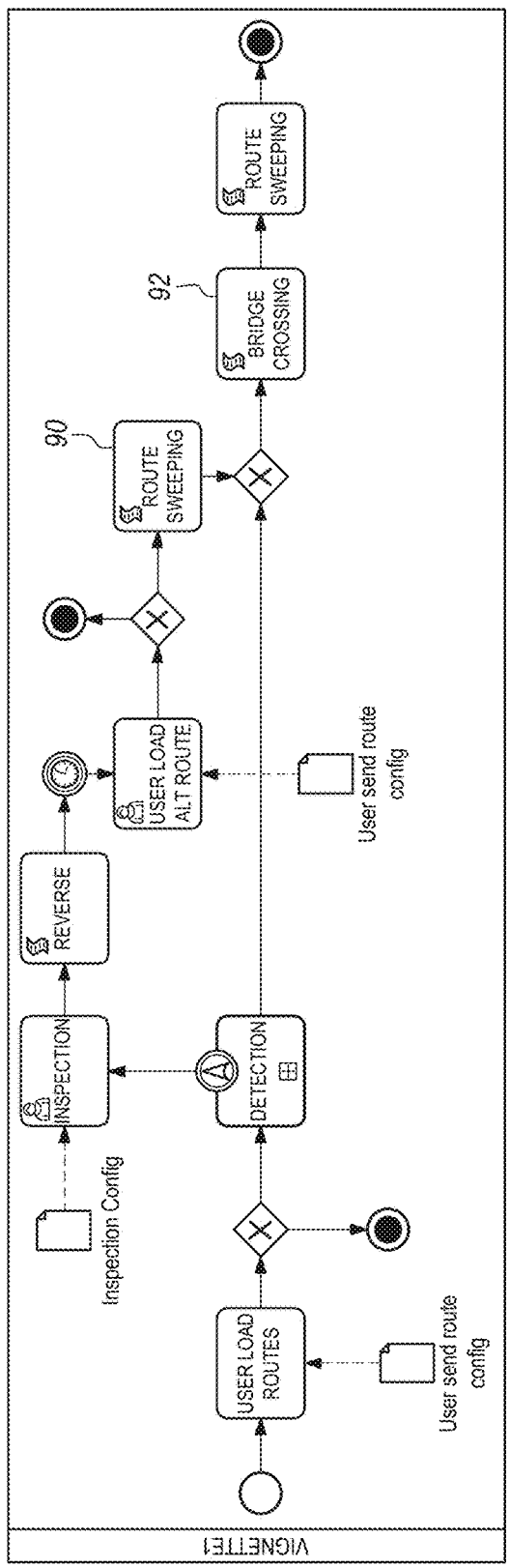
FIG. 1A can be a diagram of an example mission encoded using the systems and methods of the present invention according to several embodiments.

The proposed methods of the present invention can adapt the general business process model notation (BPMN) for military unmanned system mission design applications and can combine BPMN with adaptive resource allocation to create a role-based mission design framework. This framework can allow a user to visually and deliberatively design a mission as a process diagram where the atomic process elements can consist of decision elements and coordinated control modalities annotated for resource requirements. The designed mission can be verified prior to execution and then directly transmitted as commands to a group of available unmanned vehicles. The mission execution engine can be capable of actively assigning appropriate resources to different roles throughout the mission, allowing for robustness in terms of resource availability and failure.

As unmanned systems proliferate more widely into the Navy, a need arises for a simple and user-friendly method of controlling a large number of these systems with a small number of (preferably a single) operators. These operators need to control large groups of unmanned systems while ensuring that operationally relevant behaviors are executed. At the same time, the operator/end user must verify that mission objectives will be met, ensure mission longevity via ensuring adaptability and modularity, and enforce well-defined interactions with unmanned systems. A tactical mission control approach can need hierarchical abstractions to provide modularity and limit information overload. Such as approach can also need parallel sequencing to allow for parallel execution of tasks and objectives. And finally an approach can need defined and deliberate user interaction to allow operators to influence the mission during execution.

Within collaborative control methodologies, swarm or single behavior control is either highly reactive and/or focused on a single action (e.g. formation control, area coverage, positioning, etc.). One example of formation control and positioning uses potential fields to control the spacing of unmanned systems. Another approach can use task-based single-vehicle allocation where each vehicle is assigned to one task at a time. While these swarm control methodologies can possibly lead to emergent behavior, they lack a more deliberative approach that that provides for longer-term planning and decision making. A tactical mission control approach should be able to leverage these swarm behaviors while also providing more deliberative planning and control of the mission.

Some of the more deliberative approaches in the prior art can coordinate simple sequences of behaviors for a single unmanned system, or use a Finite-State Machine (FSM) to represent the mission of the team of unmanned systems. These particular approaches can include a visual programming tool, cfgedit, that can define robot missions using a Finite State Machine (FSM) representation with calls to underlying behaviors. They also can provide verification tools for such missions based on Linear-Temporal-Logic (LTL) representation of the desired outcome. FSM-based missions can be validated against these LTL specifications to ensure robots are "getting it right the first time." However, FSMs do not natively support parallel states of execution which are necessary for tactically and operationally relevant behaviors of swarms.

Another popular prior art approach to mission design can be to define a custom language for specifying different parts of a mission, desired behaviors to be called and their parameters. These approaches can use an XML based custom language to specify missions for underwater robots. As versatile as this approach can be, it is not very user friendly for large missions and also does not lend itself to other mission types on different (e.g., aerial) platforms.

The systems and methods of the present invention according to several embodiments, also referred to herein as Mission Modeling, Planning, and Execution Module (M2PEM), can leverage business process logic to coordinate tactical behaviors and mission objectives between a heterogeneous team of unmanned systems. To do this, M2PEM can leverage Business Process Modeling and Notation (BPMN) 2.0 to develop mission models by extending a subset of BPMN 2.0 for robotic applications. Hierarchical abstractions fundamental to BPMN can allow the mission, designed graphically, to be naturally decomposed into interdependent parallel sequences of Activities, Gateways, and Events.

Figure 1B:
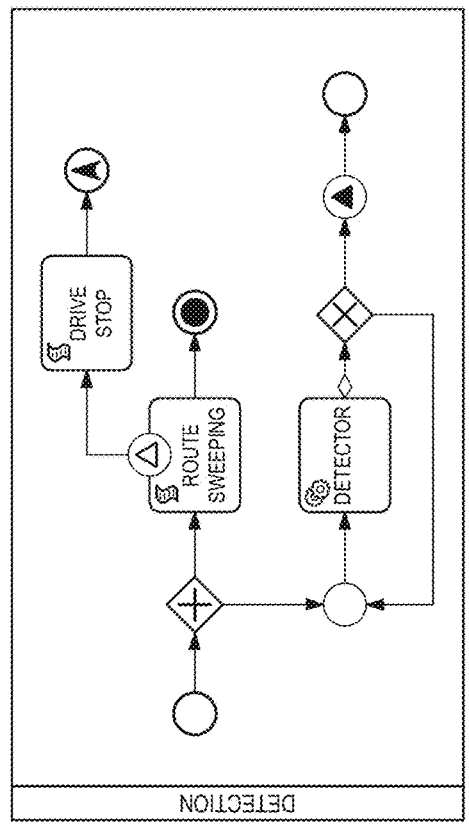
FIG. 1B can a diagram which can show the detection task of FIG. 1A in greater detail.

Referring now to FIGS. 1A-1B, FIG. 1A can illustrate an example mission encoded as an M2PEM mission model (the detection module in FIG. 1A is shown in greater detail in FIG. 1B). The graphically defined mission can be encoded as a mission model diagram and can be stored in a machine readable extensible machine language (XML) standard format. It can be parsed and processed by the M2PEM executive. The executive can consist of a resource manager used to assign resources to roles within each activity and an execution engine for commanding the behavior defined by each activity to the appropriate robots and/or resources. The BPMN notation symbology, architecture and methods can be described more fully below.

2. M2PEM Architecture

In most robotics applications or robotics software development environments, missions have to be implemented or described in code or via configuration files. This approach is not only complex and cumbersome for a developer of this system, but also is inaccessible to someone without direct domain knowledge. Graphical tools such as BPMN can be easy-to-understand constructs for describing a sequence of actions, or more specifically, the flow of a process. For example, an organization could use BPMN to describe how a customer service representative should handle a product return. Similarly, BPMN can be adapted and configured for teams of heterogeneous robots, to model how a team of multiple robots should handle a detection from a sensor during a mission.

The systems of several embodiments can use BPMN as one process to graphically describe missions for multi-agent robotic systems, while providing an execution and verification engine for autonomously running these missions on the system. M2PEM can use the BPMN 2.0 specification to allow a user to plan out the mission for a system of multiple robots. Extensions to the BPMN 2.0 specification in M2PEM can correspond to special constructs that are applicable to a robotic system, and that are explained further in Section 3 below. Prior art missions can be scripted with static resource allocations, which can mean that vehicles and payloads are assigned to roles for each activity within the mission at design time. These allocations cannot be changed during execution, and the mission will fail if a vehicle or payload cannot be found by the resource manager.

M2PEM can feature an execution engine to directly control the vehicle and payloads in the system via interfaces to the Robotics Operating System (ROS). As used herein "ROS" can be taken to mean a architecture, or a collection of software frameworks for robot software development). Although ROS is not an operating system, it can provide services designed for a heterogeneous computer cluster such as hardware abstraction, low-level device control, implementation of commonly used functionality, message-passing between processes, and package management. Running sets of ROS-based processes can be represented in a graph depiction where processing can take place in nodes that may receive, post and multiplex sensor data, control, state, planning, actuator, and other messages. Despite the importance of reactivity and low latency in robot control, ROS itself is not actually a real-time operating system (RTOS). It can be possible, however, to integrate ROS with real-time code, as described herein. M2PEM can also feature a verification module, which is capable of checking for erroneous logic in the mission (such as dead/live locks). The verification can also verify mission specifications such as (but certainly not limited to) "each robot has to survey at least two locations", for example, which can be expressed in Linear Temporal Logic (LTL)

Figure 2:
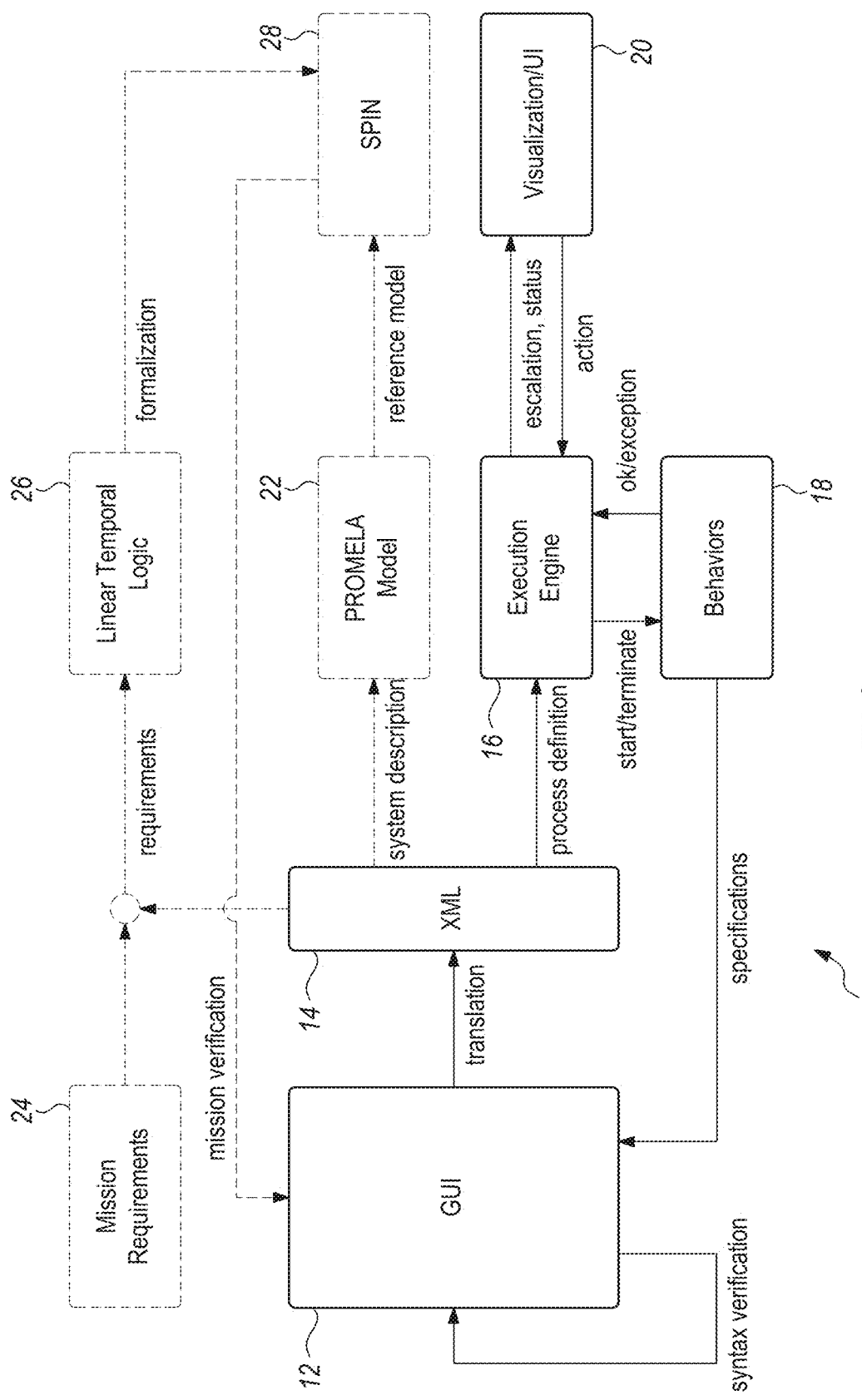
FIG. 2 can be a block diagram of an example architecture for the systems and methods according to several embodiments, which can be used to encode the mission in FIG. 1A.

Referring now to FIG. 2, FIG. 2 can be taken to depict one architecture of the systems and methods of the present invention according to several embodiments. FIG. 2 depicts the architecture of several embodiments of the M2PEM, which can be seen, and can be generally referenced using reference character 10. Architecture 10 can include a graphical user interface (GUI) 12, which can be used to create and edit a mission model. The GUI 12 shown in FIG. 2 can use CAMUNDA® by Camunda Services GmbH (Germany), but other GUI's could certainly be used. Architecture 10 can further include a translator 14 that can receive the missions and that can translate and store the mission description into a file that can be understood by the unmanned vehicle robot operating system (ROS) as a standard BPMN XML mission file that can be passed to the execution engine 16.

The execution engine 16 can parse this mission file and, if it passes the syntax and parsing checks, engine 16 can prepare for execution. Once signaled to start executing, the execution engine can transmit the XML mission files, or a portion thereof, to the respective robot operating system (ROS) interfaces of an unmanned vehicle (or a plurality of unmanned vehicles, or swarm) to systematically move through the mission model, following the flows and calling vehicle and payload behaviors corresponding to active mission blocks (represented by block 18 in FIG. 2). GUI 12 can double as a visualization of mission progress (depicted by block 20 in FIG. 2), highlighting currently active blocks in the GUI screen. Visualization block 20 can be displayed at GUI 12, but it can also be monitored remotely for some embodiments.

The architecture 10 of the present invention can further include a verification sub-architecture, which can be depicted by the dotted lines in FIG. 2. More specifically, the mission model file at translator 14 can be translated to Process Meta Language (PROMELA®) format at block 22 and can be checked against non-graphical mission requirements depicted at block 24 using the SPIN (Simple PROMELA® Interpreter) model checker 28 (SPIN can be a general tool for verifying the correctness of concurrent software models in a rigorous and mostly automated fashion). To do this, the mission requirements can be described and can be encoded as LTL specifications at block 26. SPIN module 28 can verify the mission by comparing the LTL specifications to the PROMELA® translation (of the XML translation of the BPMN graphical description). The verification sub-architecture can be described more detail in Section 5 below.

The architecture 10 described herein can also be found described in a paper by de la Croix, et al. entitled "Mission modeling, planning, and execution module for teams of unmanned vehicles", published in Proc. SPIE 10195, Unmanned Systems Technology XIX, 101950J (5 May 2017); doi: 10.1117/12.2266881 (2017). The contents of the de la Croix paper are hereby incorporated by reference herein.

3. Mission Model and User Interface

A mission can be the highest level description of what robots should accomplish when they are deployed. In M2PEM, missions are encoded as mission models, which can be a set of processes required to complete a particular mission. M2PEM can currently use a subset of the BPMN 2.0 standard to define the activities and process flow (collection of tasks and their transitions) inherent in a mission model. For ease of use, a graphical model of the mission can be created by the operator at GUI 12 using notions defined by BPMN notation (including BPMN 2.0). This mission model diagram can have a one-to-one equivalent BPMN standard XML representation, generated at XML translator and dubbed the mission model file. As mentioned, a relevant subset of BPMN was chosen for initial implementation. This subset can include process, call activity, user task, script task, service task, gateway, and multiple types of events. Elements included in the events category can include signals, escalations, and boundary events. Each process can contain an interdependent, potentially parallel, sequence of activities, gateways and events. It should also be appreciated that new robot-specific BPMN elements can be defined and can be added to the BPMN notation as needs arise, for example, when a new robot capability becomes available, or when there is a shift in tactics policy, which can create a need for new BPMN symbology.

Figure 3:
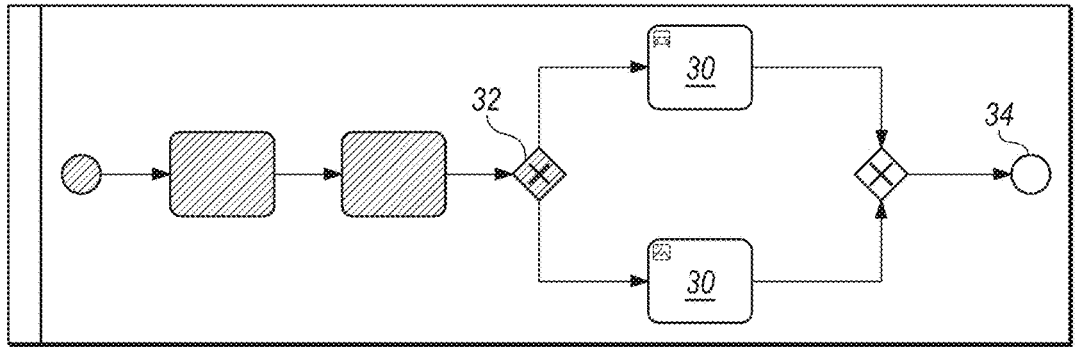
FIG. 3 can be prior art depiction of standard Business Process Model Notation (BPMN) standard symbology.

In M2PEM, activities can be composed of atomic behaviors consisting of collaborative control modalities using a role-based framework for defining required and optional resources for execution. Referring now to FIG. 3, a prior art generic Business Process Model Notation (BPMN) diagram can be shown, which can illustrate standard BPMN symbols as known in the prior art. As shown, BPMN can include activities 30 (rectangles), gateways 32 (diamonds, in FIG. 3 a BPMN exclusive gateway is shown, the cross symbol inside of the diamond is what makes the gateway exclusive) and events 34 (circles) Activities include sub processes, call activities, and tasks. Sub processes can be equivalent to a process, except they encapsulate the entire sequence within one activity and can be manipulated like the other activities. They can also only be defined within other processes, and can access all of the parent process's data. In addition, they can only have plain start events, no other type of start events like timer- or message-based start events. Call activities are very similar to sub processes, except they are defined globally (i.e. not within another process) and referenced within other processes. Call activities can also not implicitly have access to the parent process's data, nor are they limited to plain start events.

Tasks can represent individual activities 30 to be executed, and can be of many types. M2PEM primarily uses script, service and user tasks. Script tasks can contain a piece of code that can be executed or interpreted directly by the execution engine. Service tasks can be linked to specific C++ class objects that can be executed. User Tasks can allow a user to directly interact with the autonomous system while it is executing its mission. User tasks can be configured via a data file object in the mission model. This data file object can include a prompt to provide to the user and a series of decisions to choose from.

Data-driven Gateways 32 can be used to access situational data, as well as change the flow of the mission. They can also split the mission into parallel execution flows or merge multiple parallel flows back into one flow. Events allow for external stimuli to influence process flow, and throw/catch type events all contain a unique identifier or UID. When execution flow hits a throw event, the unique identifier is used to look up any catch events of the same type and if one or more is found the execution flows to those events.

Figure 4:
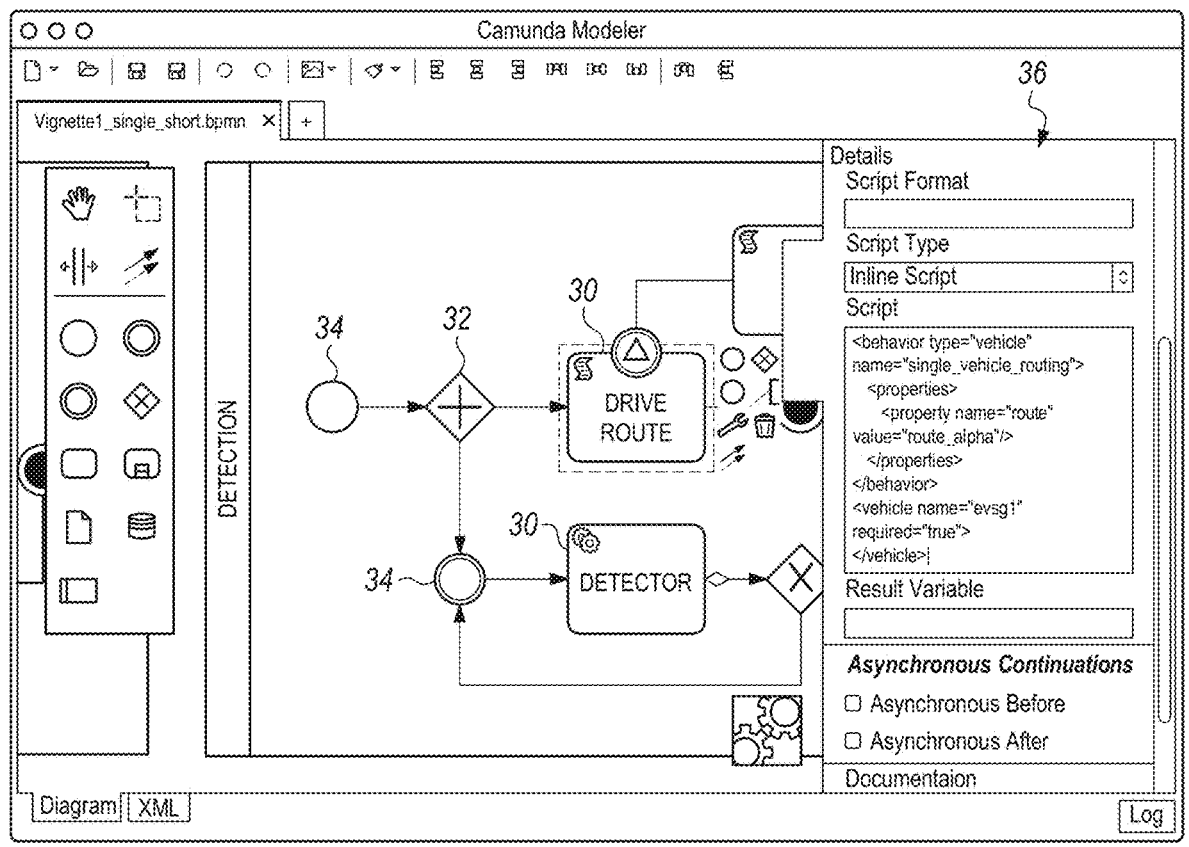
FIG. 4 can be a diagram of the screen shot, which can explain the XML script that can list the task details expanded in the detection task depicted in FIG. 1B.

Referring now to FIGS. 1A-1B and 4, the systems and methods of the present invention according to several embodiments can also adopt some of the standard BPMN elements shown in FIG. 3, and can define them to represent robotic activities of interest in the unmanned vehicle mission domain. FIG. 4 can be a screen shot of GUI 12 that does this. As shown in FIG. 4, data-driven gateways 32 can access contextual data at activity 30. For example, box 36 in FIG. 4 can show contextual data for drive route task 30, such as user decisions (e.g., use the route named route alpha), box 36, to control the flow through the mission of the present invention according to several embodiments. Tactical behaviors can be specified by using a script task with an XML script, because BPMN 2.0 is general enough to allow for special cases. That XML script can define whether it's a vehicle or payload task as well as which behavior to call, which resources to use and any parameters that the behavior needs. Vehicle tasks are those that are assigned to one or more vehicles, which can call an individual (e.g., waypoint navigation) or team behavior (e.g., formation control) on the vehicles. Payload tasks, on the other hand, will call payload behaviors (e.g., PTZ camera scan polygon) on different payloads available on vehicles. FIG. 4 can illustrate how the script task 30 (BPMN activity) labeled DRIVE ROUTE can invoke a behavior for the vehicle to follow a particular route.

The XML tag behavior depicted by box 36 can tell the execution engine that this script task is going to either be of Vehicle or Payload task type. The XML property type can define the type of behavior task and can be used by the behavior engine to address the proper arbiter via a specific ROS topic. The name property can correspond to one of the behaviors supported by the vehicle arbiter. The properties tag can specify all of the parameters for this behavior as a list of property tags. In this particular example, the single vehicle routing behavior is informed to use a route named route alpha. The other information provided to this script task is the static resource allocation, i.e. which vehicle and payload to use for each role, which in FIG. 3 can be a single vehicle named "evsg1" (a simulated vehicle), as also shown by box 36.

As mentioned above to accomplish the mission description, CAMUNDA®, which can be an open source node .js-based BPMN editor, can be selected as the standard user interface for defining a mission. It should be appreciated, however, that other BPMN editors could be used. For the present invention, the CAMUNDA® editor can be customized to allow for custom activity blocks, and can provide easy-to-edit parameter selection for those custom blocks. Other improvements made include highlighting parsing and verification errors, and visualizing mission progression using feedback from the execution engine 16 (See FIG. 2) over a custom WebSocket interface (as used herein "WebSocket" can be taken to be a computer communications protocol, providing full-duplex communication channels over a single Transmission Control Protocol, or TCP, connection). It should be appreciated that the Editor shown in FIG. 4 can be modified to visually highlight the elements in the process that are currently active. More specifically, although not shown in FIG. 4, CAMUNDA® can allow for color to be incorporated into the GUI 12 display, to facilitate operation of M2PEM at GUI 12. For example, in FIG. 4, tasks can be bright green when active but can become gray and can fade as a function of time after deactivation. Such a gradient-based color approach can be chosen to give user a chance to follow the execution path for fast moving mission flows, or important or "busy" flows at GUI 12.

4. Mission Execution

Mission execution engine 16 can be the component of the M2PEM architecture 10 that can interpret the mission plan (XML-formatted) and can follow its sequence of flows from element to element. Conceptually, the BPMN 2.0 standard can define tokens, which can be created at start events or whenever flows diverge (for example, at parallel gateways 32). The tokens can either be consumed at end events 34 or can be cancelled. The execution engine 16 can implement tokens (although this is not a requirement of the BPMN 2.0 standard) to provide the parallel threads of execution required to handle executing several mission model elements simultaneously. This section focuses on how the execution engine can uses tokens in some embodiments to execute a mission model on a robotic platform.

4.1 Execution with Tokens

Before the mission is executed, a parser (translator 14) can interpret the BPMN 2.0 mission model (an XML file) and can create an internal representation of this model. Each element in the model can be of a base type ProcessModelNode and can be linked to other elements via SequenceFlow objects. Effectively, the mission model can be internally represented as a hierarchical graph data structure. Upon being signaled to start (via a ROS service call, as described in Section 4.3 below), the execution engine can generate a token to own the first process, whose identification can be passed in via an ROS parameter in the ROS service call. This token can execute the main function of a Process, which can be to spawn child tokens for each start event (in this case, there is only one). For plain start events, the token can immediately move to the next element via the attached SequenceFlow objects. If the start event is not a plain start event, the token assigned to it would wait for that event's conditions to be fulfilled before moving via the SequenceFlow objects to the next node.

Among the different activities 30, sub processes (tasks) can be treated very similarly to a process, with the token that is assigned to the sub process spawning a new token for the start event contained within. Once the token started within the sub process reaches the end event, it can be consumed and the token assigned to the sub process can proceed to the next node. Call activities 30 can be treated similarly to sub processes, except that the token assigned to it can call the global process whose identification (ID) can be specified by the call activity. Of the task activities, script tasks can be treated special by M2PEM during execution as explained further in Section 4.2. When a token reaches a service task, the execution engine can create an instance of the class specified by the task. Then the engine can execute the instance it created and can wait for it to finish.

Figure 5:
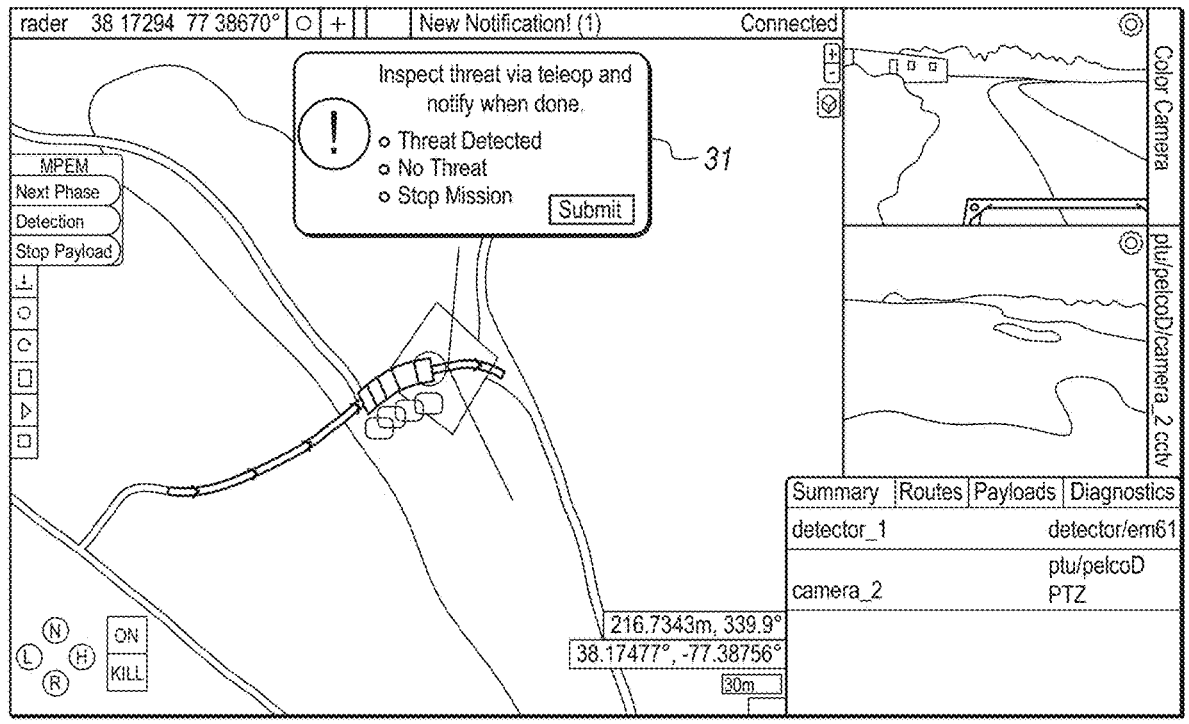
FIG. 5 can be a screen shot of a user task prompt for the systems and methods according to several embodiments of FIG. 1.

For user tasks, the execution engine can advertise the prompt and decisions on a ROS topic that is being listened to by the Operator Control Unit (OCU). The Multi-Robot Operator Control unit (MOCU) tool, which has previously been developed by the United States Navy, has been modified to interact with M2PEM, allowing for interaction via user tasks. A further description of MOCU can be found in a paper by D. Powell, G. Gilbreath, and M. Bruch, entitled "Multi-Robot Operator Control Unit", Proc. SPIE 6230, Unmanned Systems Technology VIII, 62301N (12 May 2006); doi: 10.1117/12.663817; the contents of the Powell et al. paper are hereby incorporated herein by reference. MOCU can display the prompt and decision choices to the operator, who can select one of the decisions. Upon having submitted a decision, MOCU can use a ROS service call to inform the execution engine 16 of the user's decision. This decision can be stored in the execution engine's internal data store (a SQLite database). This action can conclude the user task and the child token can proceed to the data-driven exclusive gateway. FIG. 5 can be one example of how a user decision can be displayed to the operator during a mission, i.e., as a pop up alert inset at the GUI 12 that can be displayed to the end user/operator. Other methods for displaying a user decision to the operator could be used.

Data-driven gateways can send the current token along a sequence flow that evaluates to true and spawn additional tokens for each additional outgoing sequence flow that evaluate to true. Sequence flows without a condition are always true, while sequence flows with conditions can be evaluated to check if at this instance they are true or false. These conditions can typically correspond to checking whether a particular value is equal to some constant. Exclusive gateways only select a single sequence flow, but if multiple flows evaluate to true then it selects the first one specified in the XML.

When a token reaches a timer event 34, it can wait for the specified amount of time before moving on to the next node. Throw and catch events cause tokens to spawn on nodes not necessarily connected by a SequenceFlow objects, and can also cause tokens waiting for a node to interrupt it and move on to a new node. This mechanism can use ROS topics to message between the tokens.

4.2 Script Task

Since some of the tasks in a process model are automated, commercial BPMN engines can tie those tasks via a connector to a web service that can handle a request and can respond with a result. Similarly, the execution engine in M2PEM can require a method by which it can invoke automated tasks on the hardware platform. Specifically, it can be desirable to be able to invoke vehicle and payload behaviors. Arbiters in the unmanned system can be responsible for providing a service-like API to invoke behaviors. They can be commanded via a ROS topic with a specific ROS message type and provide status updates on a separate ROS topic.

The execution engine can first use the static allocation specification within the script task to get an allocation from the resource manager. The resource manager can use a resource graph that can contain availability information on all vehicles and payloads to validate the static allocation. If the vehicle is available, it then addresses the arbiter via a predefined ROS topic and populates a command message with the behavior name and key-value pairs for all of the parameters. The script task can then monitor a specific ROS status topic advertised by the arbiter to check if the behavior is running. As long as the arbiter is running the behavior, the script task can remain active. If the script task detects that the behavior is no longer running (could be due to the behavior completing, or the behavior was aborted), then it can either complete or can throw an exception depending on the outcome of the behavior. Exceptions can be caught by boundary error events and handled in the model, otherwise they are propagated to the parent process until they are handled or abort the mission.

4.3 Mission Control

External to the mission execution, the operator using MOCU can have the ability to interact with the mission. Specifically, MOCU has the ability to start and stop a mission. Starting a mission can require a file location (URL) to the mission or use of the M2PEM editor to directly send the BPMN file. Stopping a mission can cascade through the mission plan and terminate all tokens. Arbiters with active behaviors can be notified of this termination.

MOCU can also be able to provide the execution engine 16 with waypoints or a route that can be referred to by the mission model. For example, a series of waypoints can be stored as route_alpha and can be used as a parameter for a vehicle behavior. Signals (with a specific UUID) can also be emitted from MOCU and can be caught in the executive engine. These signals may, for example, be used to abort specific portions of the mission without stopping the entire mission.

All mission control functionality can be achieved using ROS services. This provides a standard ROS interface to the execution engine and can allow for multiple OCU's to interact with it in the same manner.

4.4 Execution Example

Figure 6A:
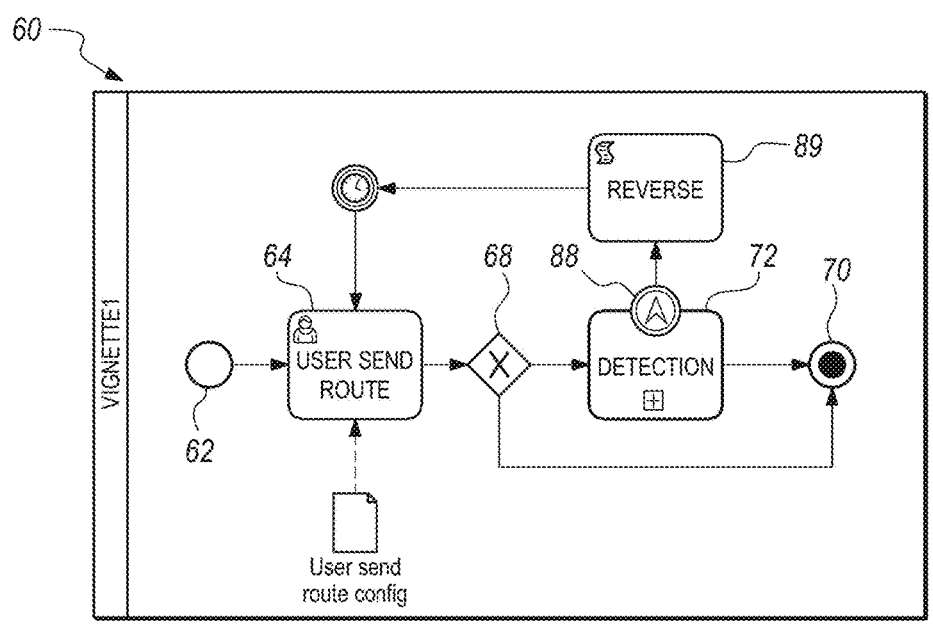
FIG. 6A can be an example high-level mission encoded using the systems and methods according to several embodiments.
Figure 6B:
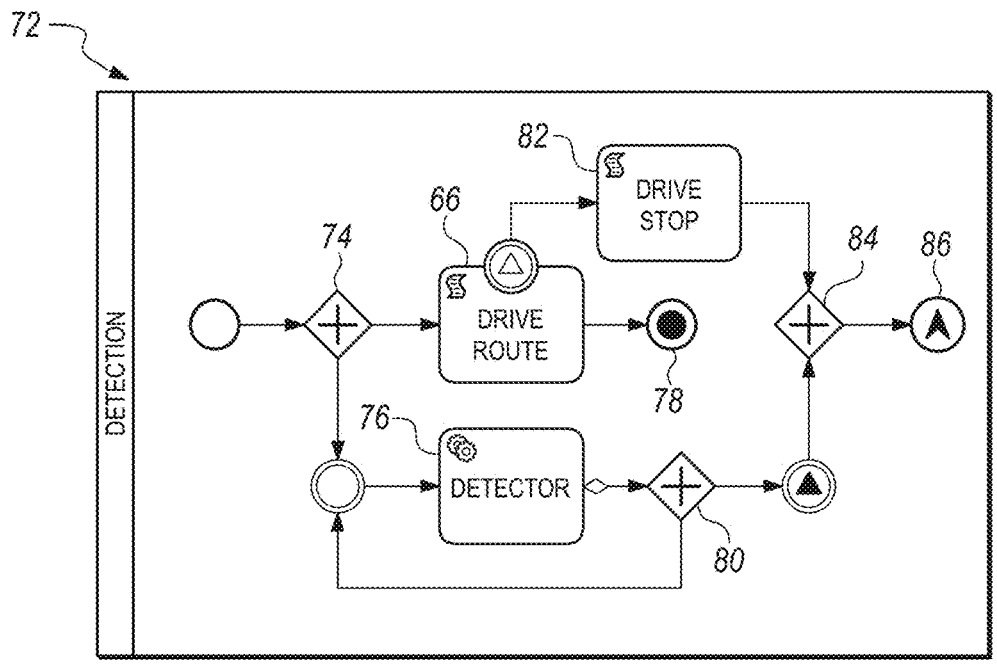
FIG. 6B can be an example mission encoded, which can illustrate the detection task in FIG. 6A.

Referring now to FIGS. 2 and 6A-6B, FIGS. 2 and 6A-6B can be used to illustrate the execution of a simple example mission by the systems and methods of the present invention according to several embodiments. FIGS. 6A-6B can include many of the elements that were exercised during field testing as an example mission encoded using M2PEM as described above. These can include custom user tasks that interact with MOCU, script tasks that command the vehicle or payload arbiters, and service tasks that invoke custom code blocks. Other BPMN 2.0 elements such as timer events, escalations, and data-driven gateways can also be included.

Upon being signaled to start the execution engine 16 can generate a token to own the process 60 labeled VIGNETTE1 in FIG. 6A. That token can then generate tokens for each start event within the process, of which there is only one, start event 62 in FIG. 6A. Since this start event does not have an event definition, the child token immediately uses the sequence flow to move onto the user task 64 labeled USER SEND ROUTE.

At this point, the execution engine 16 can advertise the prompt and decision choices to MOCU and can wait for the operator's response. In this case, the operator must also make sure that the M2PEM execution engine has access to the appropriate route required by the DRIVE ROUTE script task 66 later in the mission (Please see FIG. 6B). Once the operator's response is recorded into the internal data store, flow moves on to the exclusive gateway 68. For this gateway 68, each outgoing flow checks whether the user decision (from the previous user task) is equal to continue or abort. The evaluation is achieved by looking up the value of user.decision stored in the data store.

If user.decision equals abort, the token would follow the sequence flow that bypasses the next block and arrive at the terminating end event 70 in FIG. 6A (which would conclude the mission). Suppose that user.decision instead equals continue. Referring primarily now to FIG. 6B, the token can move onto the call activity 72 labeled DETECTION in FIG. 6A. This call activity can spawn a new token for the process labeled DETECTION. This sub process spawns a new token for its start event, which then arrives at a parallel gateway 74 (designated by a "+" sign vice a "×" sign in FIG. 6B). A new token is generated to follow the path that leads to the service task 76 labeled DETECTOR, while the token processing the parallel gateway can move onto the script task 66 labeled DRIVE ROUTE.

When the DRIVE ROUTE script task concludes, the token can arrive at a terminating end event 78 (see FIG. 6B) for this sub process, which would then allow the token in the main process on the call activity to proceed to the terminating end event 70 of the main process in FIG. 6A and conclude the mission. However, this particular script task also has an attached boundary signal event. If the signal event is triggered, the token proceeds along the alternate path to another script task 82 (FIG. 6B) labeled DRIVE STOP.

Switching to the bottom half of the detector sub process in FIG. 6B, the other token spawned from the parallel gateway can be executing the service task 76 labeled DETECTOR. In this case, the Detector class is called, which listens to a ROS topic for a detection message and writes into the data store information about the detection including the detection source device (for example, detection.type is "gpr" for ground penetrating radar). The following data-driven exclusive gateway 80 can have two outgoing sequence flows with a condition to check if detection.type is equal to gpr or not. If not, the token can proceed along a path that returns it to the service task. Otherwise, the token proceeds to an intermediate signal throw event.

In this mission model, the signal UUID of the intermediate signal throw event can be equal to the boundary signal event on the script task labeled DRIVE ROUTE. Consequently, if there is a token on the script task and another token arrives at this intermediate signal throw event, then the boundary event on the script task will be caught and processed. If this situation occurs, the token on the intermediate signal throw event proceeds to the parallel gateway 84 and can be consumed, while the token on the script task follows the path along the boundary event to also arrive at the same parallel gateway. Since all pathways to the parallel gateway have been activated, this token proceeds to the end event 86, which can emit an escalation.

This escalation event is caught by the boundary event 88 on the call activity in FIG. 6A. Consequently, the token on the call activity follows the path along the boundary event to the script task 89 labeled REVERSE in FIG. 6A, and eventually back to the original user task labeled USER SEND ROUTE 64. The mission can continue until the terminating end event 70 can be reached in the main process 60 labeled VIGNETTE1 in FIG. 6A.

5. Mission Verification

As mentioned above, architecture 10 can have verification aspects. One goal of mission verification can be to check the mission model for any errors and against any mission requirements. To do this, one approach to verification according to some embodiments of the present invention can use the SPIN model checker, a tool for analyzing the logical consistency of concurrent systems described in the Process Meta Language (PROMELA®). SPIN was chosen over other model checkers due to being freely and actively maintained since 1991, and also because it has a known, dependable history of use in flight projects that use unmanned aerial vehicles (UAV's), use of Linear Temporal Logic (LTL), and ability to generate C++ binaries for problem specific model checkers that are fast and memory efficient. Since SPIN operates on PROMELA® models, the systems and methods can first automatically translate BPMN mission models into PROMELA® models using a combination of an XML parser and predefined templates for each BPMN element. The templates can correspond to BPMN elements—tasks, signals, (sub)processes, call activities, and parallel gateways. A set of LTL formulations can also be included to check for safety (e.g., deadlocks and mutual exclusion) and liveness properties (e.g., starvation and deadlocks). SPIN can be run with the generated PROMELA® model files and any LTL specifications as inputs, and the output can be manually checked to verify that the mission is valid. An exemplary LTL specification (i.e., mission requirements) can be "Does the mission reach a proper end state?", which in LTL can be expressed as, "Is the end event eventually true (active)?"

Figure 7:
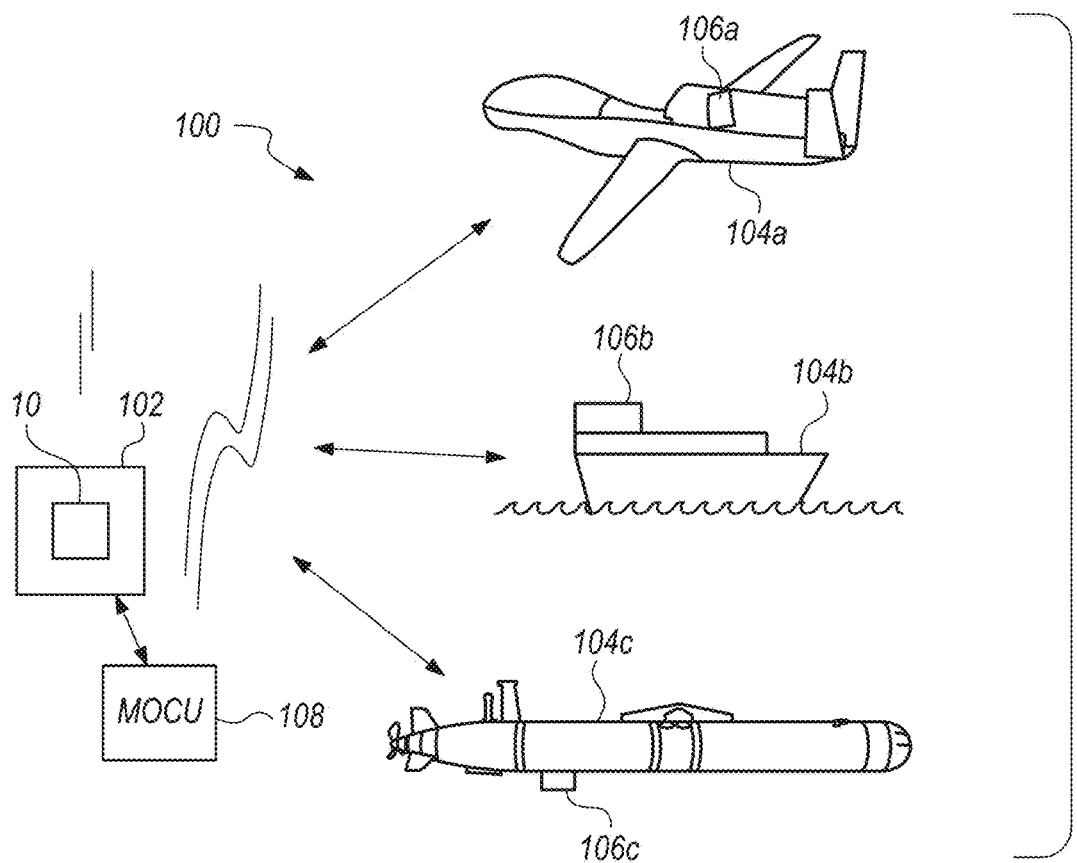
FIG. 7 can be a diagram of a plurality of a team of unmanned vehicles of the systems of the present invention according to several embodiments.

Referring now to FIG. 7, a diagram which can depict the system 100 according to several embodiments can be shown. As shown, system 100 can include a local station 102, which can incorporate the architecture 100 described above. System 100 can further include various combinations of unmanned vehicles 104, including unmanned aerial vehicles (UAV's) 104a, unmanned surface vehicles (USV's) 104b and unmanned underwater vehicles (UUV's) 104c, as shown in FIG. 7. Unmanned vehicles 104 can be in communication with local station 100 (and execution engine 16 of architecture 10), either through the internet, or directly through radiofrequency (RF) communications. The aforementioned XML files of ROS instruction can be received and respective ROS interfaces 106a, 106b, 106c of UAV 104a, USV 104b and UUV 104c. In some embodiments, Multi-Operator Control Unit (MOCU) 108 can be a separate unit that can be in communication with station 100 to affect the mission as described above. In still other embodiments, architecture 10 can be installed on MOCU 108 so that GUI 12 can be deployed on MOCU 108 for accomplishment of the methods for the present invention according to several embodiments.

6. Field Tests

Figure 8A:
FIG. 8A can be a picture of an actual team of FIG. 7 accomplishing a route sweeping task during an operational test of the systems and methods or several embodiments.
Figure 8B:
FIG. 8B can be a picture of the team of FIG. 7 accomplishing an explosive hazard detection task.

Referring now to FIGS. 1A and 8A-8C and 11, a successful operational test of the systems and methods of the present invention of several embodiments can be depicted and described. More specifically, M2PEM mission depicted at FIG. 1A was successfully demonstrated in multiple test events in California and Virginia, commanding a single as well as a team of autonomous High Mobility Multipurpose Wheeled Vehicles (HMMWVs). Vehicle and payload arbiters provided a host of section-level and vehicle-level behaviors; Road-following Formation, Route Sweep 90, Bridge Crossing 92, and Area Observe (not shown in FIG. 1A) are examples of behaviors commanded by M2PEM during the demonstration events. FIG. 8A can depict two vehicles executing formation control task. The M2PEM framework can provide for defining a scan task for the pan-tilt-zoom (PTZ) camera on the aft (trailing) vehicle while it is in formation with the lead vehicle.

M2PEM can provide the section-level planner for the aforementioned demonstration that took place in California and Virginia. There were four vignettes designed to showcase multiple situations involving detection and defeat of explosive hazards. The first involved switching routes after discovering and inspecting an explosive hazard blocking a first route, then crossing a bridge. Vignette 2 showcased the maneuverability of a plurality of platforms, and had the vehicles split up, and then join back together. The third vignette involved inspecting a bridge that was deemed suspicious, discovering an explosive hazard under the bridge, then choosing a new route and having a mine roller in front clear the route. The last vignette starts with normal route following, then after a triggerman is discovered, has a platform with a ground-penetrating radar (GPR) take the lead and stop the formation once an explosive hazard is discovered.

Figure 8C:
FIG. 8C can be a picture of the team of FIG. 7 conducting an explosive hazard inspection task.
Figure 9:
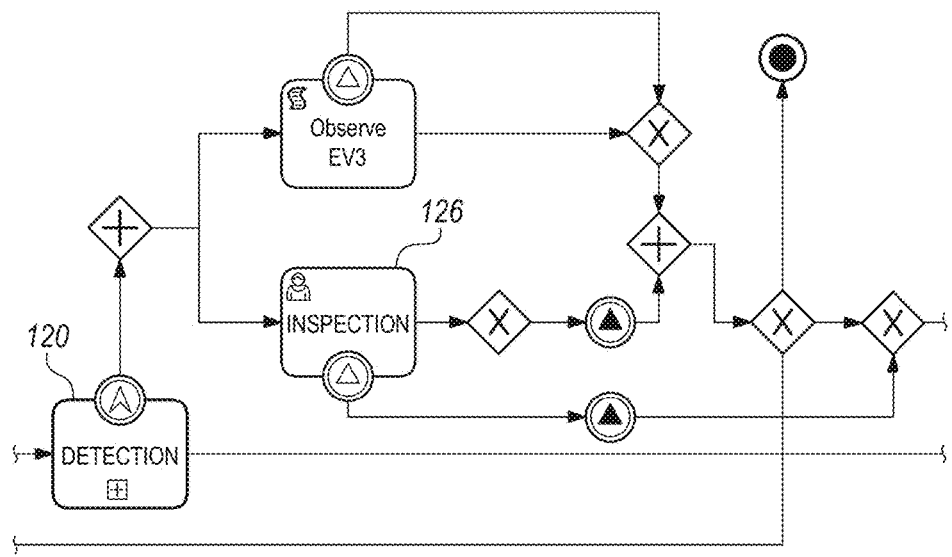
FIG. 9 can be a block diagram of the mission described in FIGS. 8A-8C using the methods of the present invention according to several embodiments.
Figure 10:
FIG. 10 can be a picture of a screen shot of the task of FIG. 12, which requests further input from the user before continuing with the task of FIG. 11.
Figure 11:
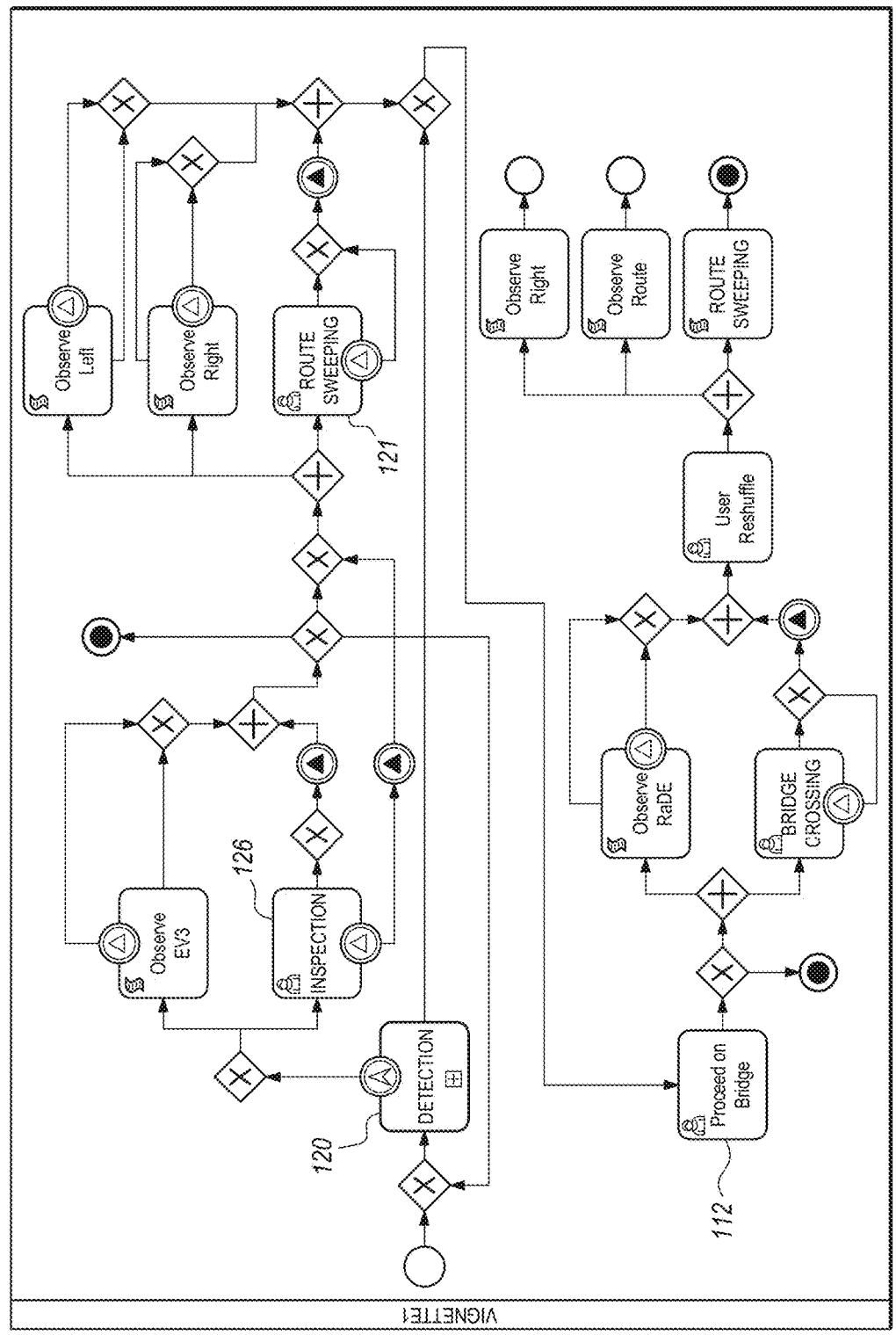
FIG. 11 can be a graphical description of an exemplary mission accomplished by the systems and method the methods.
Figure 12:
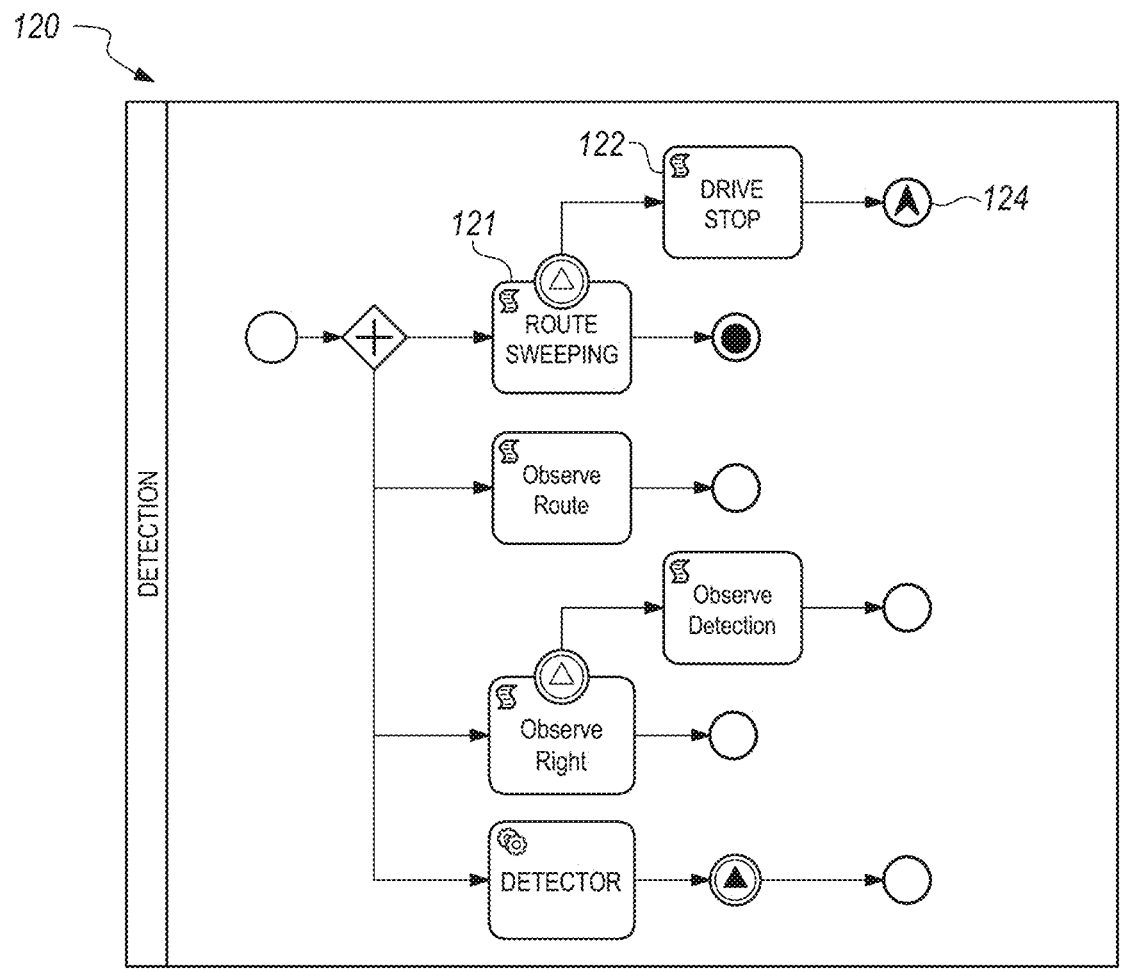
FIG. 12 can be block diagram in BPMN format for the detection activity for the mission depicted in FIG. 11; and, FIG. 13 can be block diagram which can be illustrative of steps that can be accomplished using the systems and methods of the present invention.

Referring now to FIGS. 8A, 11 and 12, the first vignette can be shown in different points in time, and can include four vehicles, three autonomous and one manned, and three main parts to the mission 120 as depicted in FIG. 12. The mission starts with the main route sweeping 121 and detection section 122 (FIGS. 8A, 11, 12). After a detection occurs (FIG. 8B), M2PEM can send a signal which causes the token at "route sweeping" 120 to move to "drive stop" 122 and then escalates out of the main detection sub process 120 (FIGS. 11 and 12). The token then moves into the inspection area of the mission (FIGS. 9 and 11) where the operator can use M2PEM to send a second vehicle over to the detection site to get a second confirmation (FIG. 8C). After the inspection and alternate route traversal, the mission calls for operator confirmation before crossing the bridge. One way to do this can be to issue a screen alert at GUI 12, as illustrated in FIG. 10. FIG. 10 is an alert for the mission 110 depicted in FIG. 11, which is asking the operator whether or not task 112 in mission 110, i.e., whether or not to proceed on the bridge. To do this, M2PEM can send a signal to MOCU, and can wait for the response. Once the operator has confirmed that the operator wants the unmanned vehicles to cross the bridge, M2PEM enters the bridge crossing behavior task 128 in FIG. 11 and can then end the mission with a route sweeping afterwards.

Figure 13:
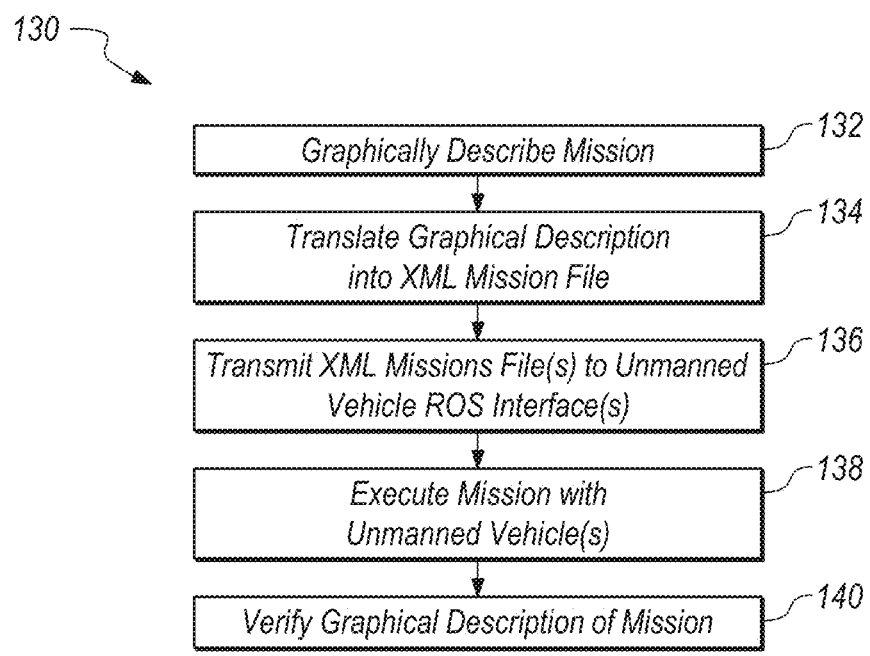

Referring now to FIG. 13, a block diagram 130 is shown, which can be illustrative of steps that can be taken to accomplish the methods of the present invention according to several embodiments. As shown, methods 130 can include the step of graphically describing the mission using BPMN notation, as depicted by box 132, and translating the BPMN graphical description into ROS instructions, which can be formatted an XML mission file, as shown by step 134. The ROS instructions can be transmitted to the unmanned vehicles, step 136, and the plurality of unmanned vehicles, using the ROS instructions (XML mission files) can execute the mission, as shown by step 138. The methods can also include the step 140 of verifying the graphical description. The methods can be accomplished using the structure and cooperation of structure cited above.

7. Future Work

Future embodiments of the present invention can include adding dynamic resource allocation to the resource manager.

This can allow M2PEM to adaptively assign assets to roles within the mission at execution time. Additionally, dynamic resource allocation can help cope with resource failure by allowing it to change which asset is assigned to which role when an asset fails. Other embodiments can also provide the verification output from SPIN in the custom BPMN modeler of the present invention (or in the OCU) to highlight any issues in the mission model for the operator. The set of supported BPMN elements, specifically data-driven inclusive and exclusive gateways, event-based gateways, and data artifacts (data stores and objects) can be expanded. Still further a richer set of LTL mission requirements can be tested to demonstrate the efficacy of the verification module.

In view of the above, it can be seen that M2PEM can be a powerful, user friendly and multi-mission capable mission executive. Compared to BPMN (or other modeling languages), M2PEM provides not only extensions that are specific to robotics, but more importantly, a ROS-compatible execution engine that can interact with actual hardware. Compared to other mission planners, M2PEM's mission can be described graphically without writing code or configuration files. M2PEM effectively brings BPMN into a robotics application, which is novel. Other state of the art approaches can include writing LTL or drawing state diagrams of the missions. While these are feasible and demonstrated approaches, using BPMN for modeling and notation is somewhat more powerful than state machines, because BPMN supports concurrency, information flow, signals, exceptions, and other constructs that are not describable in standard state machines. Consequently, M2PEM can be capable of supporting more complex missions (including those for multiple vehicles and payloads). M2PEM can easily be configured for other vehicles types and application domains; these can be topics of on-going work, along with standardization of the executive and arbiter interfaces for heterogeneous and multi-domain missions.

The fundamental ability for BPMN diagrams to utilize graphical hierarchical abstractions can allow the mission design to be naturally decomposed into parallel sequencing of objectives that must be satisfied. Each mission objective can then likewise be decomposed into behaviors that one or more unmanned system will be executing to accomplish the objective. Finally, each behavior is defined in terms of parallel sequencing of atomic control modalities. Prior to deployment of the mission and for health analysis during execution, performance can be analyzed to verify the ability of the unmanned systems to execute each behavior and objective both in terms of resource availability and nominal performance characteristics of the different systems.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for accomplishing a mission using a plurality of unmanned vehicles, said method comprising the steps of:
    A) graphically describing mission tasks at a graphical user interface (GUI) using Business Process Model Notation (BPMN) systems, wherein the graphical user interface allows user decisions of an activity by allowing an end user to select the activity through a pop up alert inset, thereby directly interacting with plurality of unmanned vehicles;
    B) translating the graphical description from said step A) into formatted robot operating system (ROS) instructions which can be input into each of said plurality of unmanned vehicles;
    C) transmitting the ROS instructions to said plurality of unmanned vehicles; and
    D) executing the mission by said plurality of robots according to the ROS instructions wherein, at any time during executing the mission, the mission is stopped using a Multi-Operator Control Unit (MOCU), new BPMN elements are added, and a new mission is started using the MOCU;
said graphical description step being accomplished by the end user.

2. The method of claim 1, further comprising the step of:
    E) verifying the graphical description of the mission.

3. The method of claim 2, wherein said verification step is accomplished with a Simple Process Meta Language Interpreter component, by comparing a linear temporal logic (LTL) description of the mission to a Process Meta Language translation of the ROS instructions.

4. The method of claim 1, wherein said translation step is accomplished by an extensible machine language (XML) editor that receives the BPMN graphical description as an input.

5. The method of claim 4, wherein said transmitting step is accomplished by an execution engine that receives the formatted instructions from the XML editor as an XML mission file input.

6. The method of claim 4, wherein the XML editor has a XML script that defines whether a tactical behavior is a vehicle task or a payload task, thereby determining which tactical behavior to call, which resources to use, which parameters the tactical behavior needs, or a combination thereof.

7. The method of claim 5, wherein the execution engine creates a token at the start of each activity that is consumed at the end activity or cancelled if the activity is not completed.

8. The method of claim 1, wherein the graphical user interface includes a color-based gradient to indicate a status of the activity.

9. The method of claim 1, wherein at any time during executing the mission, the mission is stopped at one or more waypoints using the MOCU, new BPMN elements are added or original BPMN elements are modified, and the mission is resumed from the next waypoint using the MOCU.

10. A system, comprising:
- a plurality of unmanned vehicles, each of said plurality of unmanned vehicles having a local controller that uses robot operating system (ROS) language to operate the robot;
- a control station having a graphical user interface (GUI), wherein the graphical user interface allows user decisions of an activity by said plurality of unmanned vehicles by allowing an end user to select the activity through a pop up alert inset;
- said control station further having a translator for translating said activity into said mission ROS description; and
- said control station further having an execution engine for transmitting said mission ROS descriptions to said local controllers;
- wherein said control station can stop the execution engine, allow new BPMN elements to be added to the system, and start the execution engine after the new BPMN elements are added to the system.

11. The system of claim 10, wherein the translator uses extensible machine language (XML) to translate the graphical description into an XML formatted mission file.

12. The system of claim 10, further comprising a Multi-Operator Control Unit (MOCU) in communication with said control station.

13. The system of claim 10, wherein said control station is a MOCU.

14. A method for accomplishing a mission using a plurality of unmanned vehicles, said method comprising the steps of:
- A) graphically describing mission tasks at a graphical user interface (GUI) using Business Process Model Notation (BPMN) systems, wherein the graphical user interface allows user decisions of an activity by allowing an end user to select the activity through a pop up alert inset, thereby directly interacting with plurality of unmanned vehicles;
- B) translating the graphical description from said step A) into formatted robot operating system (ROS) instructions which can be input into each of said plurality of unmanned vehicles; and
- C) transmitting the ROS instructions to said plurality of unmanned vehicles;
- D) executing the mission by said plurality of robots according to the ROS instructions, wherein, at any time during executing the mission, the mission is stopped using a Multi-Operator Control Unit (MOCU) via a user task, new BPMN elements are added, and a new mission is started using the MOCU;

said graphical description step being accomplished by the end user.

* * * * *